US011429836B2

(12) United States Patent
Huang et al.

(10) Patent No.: US 11,429,836 B2
(45) Date of Patent: Aug. 30, 2022

(54) APPARATUS FOR PERFORMING CONVOLUTION OPERATIONS IN A CONVOLUTIONAL NEURAL NETWORK

(71) Applicant: NANJING HORIZON ROBOTICS TECHNOLOGY CO., LTD., Nanjing (CN)

(72) Inventors: Chang Huang, Beijing (CN); Liang Chen, Beijing (CN); Heng Luo, Beijing (CN); Kun Ling, Beijing (CN); Honghe Tan, Beijing (CN)

(73) Assignee: NANJING HORIZON ROBOTICS TECHNOLOGY CO., LTD., Nanjing (CN)

(*) Notice: Subject to any disclaimer, the term of this patent is extended or adjusted under 35 U.S.C. 154(b) by 892 days.

(21) Appl. No.: 16/215,964

(22) Filed: Dec. 11, 2018

(65) Prior Publication Data

US 2019/0180167 A1 Jun. 13, 2019

(30) Foreign Application Priority Data

Dec. 12, 2017 (CN) .......................... 201711319837.2

(51) Int. Cl.
*G06N 3/04* (2006.01)
*G06N 3/063* (2006.01)
*G06F 17/15* (2006.01)
*G06N 20/10* (2019.01)

(52) U.S. Cl.
CPC ............. *G06N 3/04* (2013.01); *G06F 17/153* (2013.01); *G06N 3/063* (2013.01); *G06N 20/10* (2019.01); *G06N 3/0454* (2013.01)

(58) Field of Classification Search
CPC .......... G06N 3/02; G06N 3/04; G06N 3/0454; G06N 3/063; G06N 20/00; G06N 20/10; G06N 20/20; G06F 17/15; G06F 17/153; G06F 17/16; G06F 17/175
See application file for complete search history.

(56) References Cited

U.S. PATENT DOCUMENTS

| | | | |
|---|---|---|---|
| 2017/0132496 A1 | 5/2017 | Shoaib et al. | |
| 2017/0344876 A1 | 11/2017 | Brothers | |
| 2018/0032857 A1 | 2/2018 | Lele et al. | |

(Continued)

FOREIGN PATENT DOCUMENTS

| | | |
|---|---|---|
| CN | 105681628 A | 6/2016 |
| CN | 106875012 A | 6/2017 |
| CN | 107451652 A | 12/2017 |

OTHER PUBLICATIONS

Search Report from corresponding Chinese Application No. 201711319837.2 dated Sep. 26, 2019.

(Continued)

*Primary Examiner* — Shane D Woolwine
(74) *Attorney, Agent, or Firm* — Lando & Anastasi, LLP

(57) ABSTRACT

Disclosed is an apparatus for performing a convolution operation in a convolutional neural network. The apparatus may comprise a selector for selecting one or more nonzero elements of a weight parameter, a selector for selecting a data item(s) corresponding to selected nonzero elements in input feature data, and a calculator unit for performing an operation. The apparatus may realize the convolution operation in a sparsified convolutional neural network efficiently through the hardware.

20 Claims, 3 Drawing Sheets

(56) References Cited

U.S. PATENT DOCUMENTS

| | | |
|---|---|---|
| 2018/0218587 A1* | 8/2018 | Wong ................. G06K 9/00342 |
| 2019/0114391 A1 | 4/2019 | Jaganathan et al. |
| 2019/0220734 A1 | 7/2019 | Ferdman et al. |
| 2020/0117993 A1 | 4/2020 | Martinez-Canales et al. |

OTHER PUBLICATIONS

Alwani et al., "Fused-Layer CNN Accelerators", 2016 49th Annual IEEE/ACM International Symposium on Microarchitecture (Micro), Oct. 2016, pp. 1-12.

Anwar et al., "Coarse Pruning of Convolutional Neural Networks with Random Masks", Jan. 18, 2017; retrieved from the Internet: <https://openreview.net/pdf?id=HkvS3Mqxe> [retrieved on Apr. 15, 2019].

Extended European Search Report from European Application No. 18207512.7 dated Apr. 10, 2019.

Extended European Search Report from European Application No. 18211878.6 dated Apr. 29, 2019.

Polyak et al., "Channel-Level Acceleration of Deep Face Representations", IEEE Access, vol. 3, Oct. 2015, pp. 2163-2175 [retrieved on Nov. 17, 2015].

\* cited by examiner

APPARATUS FOR PERFORMING CONVOLUTION OPERATIONS IN A CONVOLUTIONAL NEURAL NETWORK

CROSS-REFERENCE TO RELATED APPLICATION

This application claims priority to Chinese Application No. 201711319837.2, filed Dec. 12, 2017, titled "APPARATUS FOR PERFORMING CONVOLUTION OPERATIONS IN A CONVOLUTIONAL NEURAL NETWORK."

TECHNICAL FIELD OF THE DISCLOSURE

The present disclosure generally relates to convolutional neural network, and more particularly, to an apparatus for performing convolution operations in a convolutional neural network.

BACKGROUND

Deep learning technology based on convolutional neural network may be used in image recognition and detection, speech recognition, etc. with high accuracy, so it is widely used in the fields of safety monitoring, auxiliary driving, intelligent companion robot, intelligent medical treatment and the like.

The convolutional neural network is usually operation intensive. In order to reduce the amount of operations in the convolutional neural network, weight parameters of the convolutional neural network may be sparsified, i.e. the value of one or some elements of the weight parameter is forced to be set to zero, and the operation related to these zero value elements is skipped.

It is expected that the convolution operation in a sparsified convolutional neural network may be efficiently realized through a hardware.

SUMMARY

Disclosed is an apparatus for performing a convolution operation in a convolutional neural network. The apparatus may comprise: a first selector coupled to a first memory storing weight parameters, and configured to select one or more first nonzero elements of one or more kernels of weight parameters in one or more first channels, each first channel including at least one first nonzero element, and each first nonzero element being located at a same element position in the corresponding kernel, the element position being a two-dimensional location in two dimensions of height and width; a second selector coupled to a second memory storing an input feature data, and configured to select one or more first data items of the input feature data in the one or more first channels corresponding to the one or more first nonzero elements, a data item position of each first data item in the input feature data being dependent on the element position of the corresponding first nonzero element, and each first data item being located in the same first channel with the corresponding first nonzero element, and the first data item position being a two-dimensional location in the two dimensions of height and width; and a calculator configured to multiply each first data item from second selector with the corresponding first nonzero element from the first selector to obtain a product, and accumulate the product.

By means of the apparatus according to embodiments of the present disclosure, a convolution operation in a convolutional neural network in which weight parameters are sparsified in any manner may be efficiently achieved through a hardware.

Figure 1:
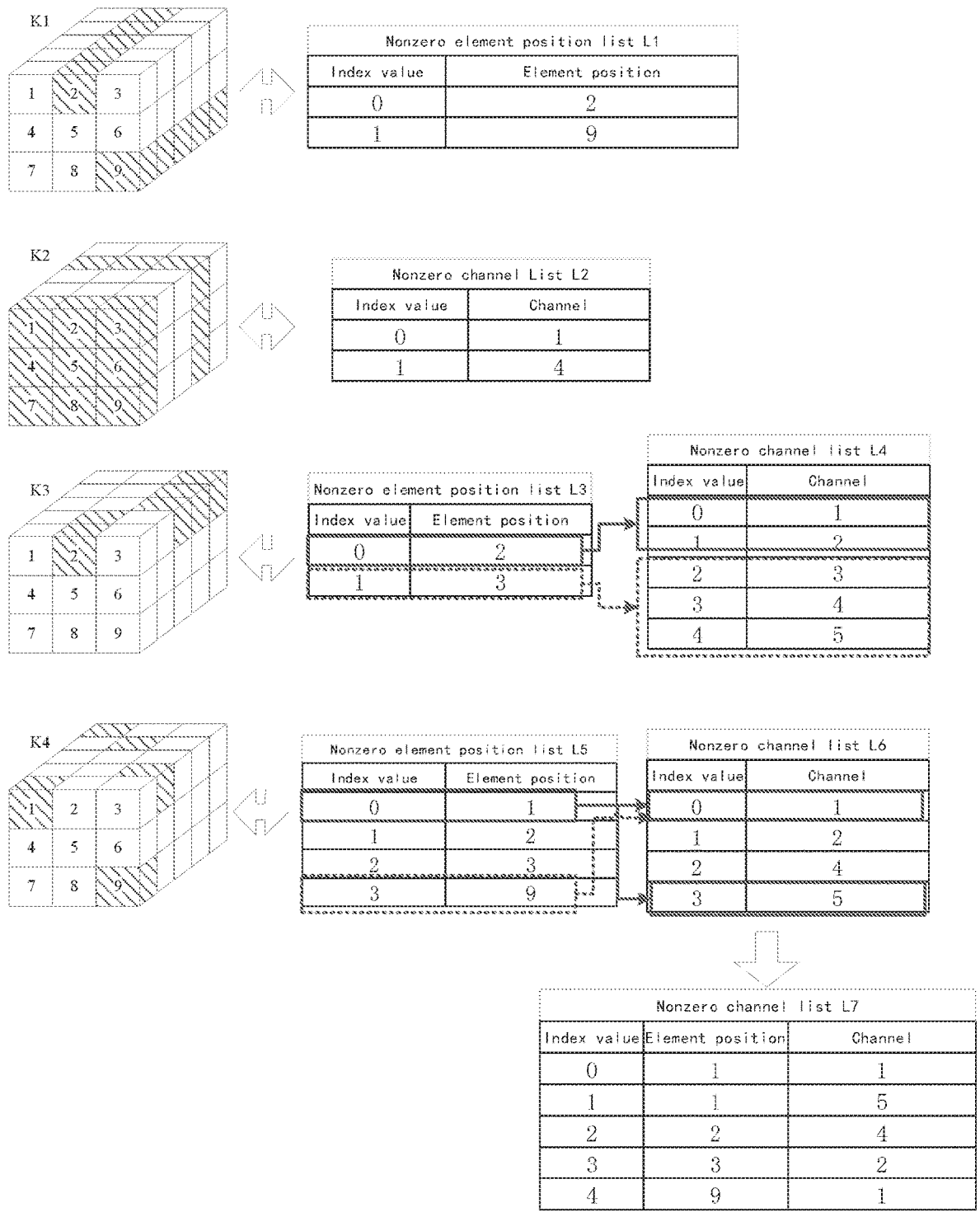
FIG. 1 illustrates an example of sparsity of weight parameters and nonzero element position list and nonzero channel list according to an embodiment of the present disclosure.

DETAILED DESCRIPTION a feature data of each layer in a convolutional neural network may be a three-dimensional data and may be represented as a data cube which has a certain height, width, and depth and is composed of a plurality of points. Any point in the data cube may be referred to as a data item of feature data, and may be represented by using a triple (x,y,z), where x may represent in which row in the data cube in top-to-bottom order the data item is located (i.e. the location in the dimension of height), y may represent in which column in the data cube in left-to-right order the data item is located (i.e. the location in the dimension of width), and z may represent in which channel in the data cube in front-to-back order the data item is located (i.e. the location in the dimension of depth).

A two-tuple (x,y) in the above-mentioned triple (x,y,z) may be referred to as a data item position of the feature data, which is a two-dimensional location in two dimensions of height and width. A data item with a data item position (x,y) may correspond to a data item in any channel in the feature data with a row number x and a column number y. Thus, any data item in the feature data may be located by a corresponding data item position and a channel number of a channel in which it is located. a two-tuple (x,y) representing a data item position may be mapped into a one-dimensional value used to represent the data item position.

A weight parameter of each layer in the convolutional neural network may be a four-dimensional data, and each kernel of the weight parameter may be a three-dimensional data. Similar to the representation manner of the feature data, each kernel of the weight parameter may also be represented as a data cube with a certain height, a certain width and a certain depth, and any point in the data cube may be referred to as an element of a weight parameter or an element of a kernel of a weight parameter. Similar to the feature data, a triple (x,y,z) can be used to locate an element in a kernel of the weight parameter. Further, a quadruple (k,x,y,z) may also be used to locate an element in the weight parameter, where k may represent in which kernel of the weight parameter the element is located (i.e. the location in the dimension of quantity), x may represent in which row of the kernel k in top-to-bottom order the data item is located (i.e. the location in the dimension of height), y may represent in which column of the kernel k in left-to-right order the data item is located (i.e. the location in the dimension of width), and z may represent in which channel of the kernel k in front-to-back order the data item is located (i.e. the location in the dimension of depth).

A quadruple (k,x,y,z) for representing an element in the weight parameter or a two-tuple (x,y) for representing an element in triple (x,y,z) in the kernel k may be referred to as an element position in the kernel k of the weight parameter, which is a two-dimensional location in two dimensions of height and width. In the kernel k, an element with the element position (x,y) may correspond to an element in any channel of the kernel k with the row number x and the column number y. Thus, any element in the kernel k may be located by the corresponding element position and the channel number of the channel in which it is located. The two-tuple (x,y) representing an element position may be mapped into a one-dimensional value used to represent the element position.

For convenience, herein, when referring to an element at one element position of one or more kernels, the element may include all elements in all channels of each kernel in one or more kernels at that element position. When referring to an element in one channel of one or more kernels, the element may include all elements in that channel of each kernel in one or more kernels.

A convolutional neural network is operation intensive. In order to reduce the amount of operation in a convolutional neural network, weight parameters of the convolutional neural network may be sparsified, i.e. the value of one or some elements in the weight parameters is forced to be zero, in order to make it to become a zero-value element. Thus, during convolving, the operation relating to these zero-value elements may be skipped, and the operation may only be performed on nonzero elements (i.e. elements with values not being zero) and corresponding data items in the feature data, such that the rate of effective operation is increased, the operation quantity is reduced, and the execution efficiency of operation is increased.

In addition, the sparsified weight parameters may be stored in a compact manner, i.e. only nonzero elements in the sparsified weight parameters may be stored, such that the storage space may be saved.

The present disclosure is not limited to the sparsifying manner of weight parameters. For example, in an embodiment, a plurality of kernels of weight parameters may be divided into several groupings and each kernel in a group is sparsified in the same manner. For example, the different groupings may be sparsified in different manner such that the distribution of nonzero elements in each of the grouping of kernels is the same. In other words, the distribution of nonzero elements in any two kernels from different groupings may not necessarily be identical (of course, it can be identical).

In another embodiment, an element at one or more element positions in one or more channels of a kernel may be set to be a nonzero element, and an element at another one or more element positions in another one or more channels of the kernel may be set to be a nonzero element.

In other embodiments, one or more channels of a kernel may be selected, and one or more elements are randomly selected in the selected one or more channels, and the selected one or more elements are set to be nonzero elements and all of other unselected elements in the selected one or more channels are zero value elements. Further, another one or more channels of the kernel may be selected, and one or more elements are randomly selected in the selected another one or more channels, and the selected one or more elements are set to be nonzero elements and all of other unselected elements in the another selected one or more channels are zero value elements.

If an element of a kernel at an element position includes at least one nonzero element, the element position may be referred to as a nonzero element position. If an element in a channel of a kernel includes at least one nonzero element, the channel may be referred to as a nonzero channel.

FIG. 1 shows an example of a sparsified weight parameter of one layer in a convolutional neural network. In this example, the weight parameter includes four kernels K1 to K4 (also referred to as weight kernels or convolution kernels), and each kernel of K1 to K4 is a data cube with a height 3, a width 3, and a depth (i.e. number of channels) 5, respectively.

As shown in FIG. 1, after the weight parameter is sparsified, in K1, only elements at the element position 2 or (1, 2) and elements at the element position 9 or (3,3) are nonzero elements; in K2, only elements in channels 1 and 4 are nonzero elements; in K3, nonzero element positions are 2 and 3, and nonzero channels are 1 to 5; in K4, nonzero element positions are 1, 2, 3, and 9, and nonzero channels are 1, 2, 4, and 5. In FIG. 1, the nonzero elements in each kernel are represented by squares with shadow.

A nonzero element position list and/or a nonzero channel list may be established for the sparsified weight parameter during sparsifying. In an embodiment, a nonzero element position list and/or a nonzero channel list may be established for each kernel of the weight parameter. In other embodiments, if the distribution of nonzero elements in each kernel of a group of kernels is identical, the nonzero element position list and/or the nonzero channel list may be established for the group of kernels.

In the example of FIG. 1, element positions 2 and 9 of the kernel K1 are nonzero element positions, and all elements in all 5 channels at each nonzero element position are nonzero elements. Accordingly, a nonzero element position list L1 may be established for the kernel K1, wherein the nonzero element position list L1 contains two items which record element positions 2 and 9 and corresponding index values, respectively.

Channels 1 and 4 of the kernel K2 are nonzero channels, and all elements in each nonzero channel are nonzero elements. Accordingly, a nonzero channel list L2 may be established for the kernel K2, wherein the nonzero channel list L2 contains two items which record nonzero channels 1 and 4 and corresponding index values, respectively.

Element positions 2 and 3 of the kernel K3 are nonzero element positions, and channels 1 to 5 are nonzero channels, respectively. Accordingly, a nonzero element position list L3 and a nonzero channel list L4 may be established for the kernel K3, and the nonzero element position list L3 and the nonzero channel list L4 may be associated with each other, wherein the nonzero element position list L3 contains two items recording nonzero element positions 2 and 3, respectively, and items with the element position 2 in the nonzero element position list L3 are associated with two items in the nonzero channel list L4 with index values being 0 and 1, respectively, and items with element position 3 in the nonzero element position list L3 are associated with three items in the nonzero channel list L4 with index values being 2 to 4, respectively. By associating the index values in L4 with the recorded element positions in the nonzero element position list L3, the location in the kernel K3 of each nonzero element in the kernel K3 may be determined based on the nonzero channel list L4 and the nonzero element position list L3.

Element positions 1, 2, 3, and 9 of the kernel K4 are nonzero element positions, and channels 1, 2, 4, and 5 are nonzero channels, respectively. Accordingly, a nonzero element position list L5 and a nonzero channel list L6 may be established for the kernel K4, and the nonzero element position list L5 and the nonzero channel list L6 may be associated with each other, where the nonzero element position list L5 contains four items recording four nonzero element positions of 1, 2, 3 and 9, respectively, and the nonzero channel list L6 contains four items recording four nonzero channels of 1, 2, 4 and 5, respectively. For example, an item in the nonzero element position list L5 with an index value of 0 may be associated with two items in the nonzero channel list L6 with index values being 0 and 3, respectively, while an item in the nonzero element position list L5 with an index value being 3 may be associated with an item in the nonzero channel list L6 with index value being 0. By associating the index values in the nonzero channel list L6 with the recorded element positions in the nonzero element position list L5, the location of each nonzero element in the kernel K4 may be determined based on the nonzero channel list L6 and the nonzero element position list L5.

In other examples, if the sparsified weight parameter further includes a kernel K5 (not shown) in addition to the four kernels K1 to K4, and the distribution of nonzero elements in the kernel K5 is exactly the same as that of nonzero elements in the kernel K1, the same nonzero element position list L1 may be used for the kernels K1 and K5. In other examples, if the sparsified weight parameter further includes a kernel K6 (not shown) in addition to the four kernels K1 to K4, and the distribution of nonzero elements in the kernel K6 is exactly the same as that of nonzero elements in the kernel K4, the same nonzero element position list L5 and the same nonzero channel list L6 may be used for the kernels K6 and K4.

It should be understood that the form of a nonzero element position list and the form of a nonzero channel list are not limited to the example shown in FIG. 1. In other embodiments, the information recorded in the nonzero channel list may be correlated with the element location of nonzero element in one or more kernels. For example, as shown in FIG. 1, the form of the nonzero channel list L6 may be set as the form of L7, wherein the information recorded in L7 is also related to the nonzero element position. For example, the nonzero element position list and/or the nonzero channel list may also include other information.

Further, the nonzero element position list and the nonzero channel list may also be combined into one list, in which each item may use three values, such as the number of kernels, the nonzero element position and the nonzero channel, as an index.

When the nonzero element position list and the nonzero channel list are used to locate nonzero elements in weight parameters, the total number of index values required (or the scale of the nonzero element position list and the nonzero channel list) may depend on the number of kernels (for example, the number of kernels in each group), the number of the nonzero element positions (for example, the number of nonzero element positions of each group of kernels), and the number of nonzero channels (for example, the number of nonzero channels of each group of kernels). In addition, as shown in FIG. 1, only one of the nonzero element position list and the nonzero channel list may be set depending on the sparsifying manner adopted for the weight parameters. In such a case, the total number of index values required (or the scale of the nonzero element position list and the nonzero channel list) may be reduced, depending on the number of kernels and the number of nonzero element positions, or depending on the number of kernels and the number of nonzero channels, for example.

In other embodiments, the index of nonzero elements may adopt the following manner: a three-dimensional data cube whose size is the same as that of each kernel is constructed for each kernel, wherein the value of element in the three-dimensional data cube may be 0 or 1, 0 represents that the element at the corresponding location of the kernel is a zero value element, and 1 represents that the element at the corresponding location of the kernel is a nonzero element.

Figure 2:
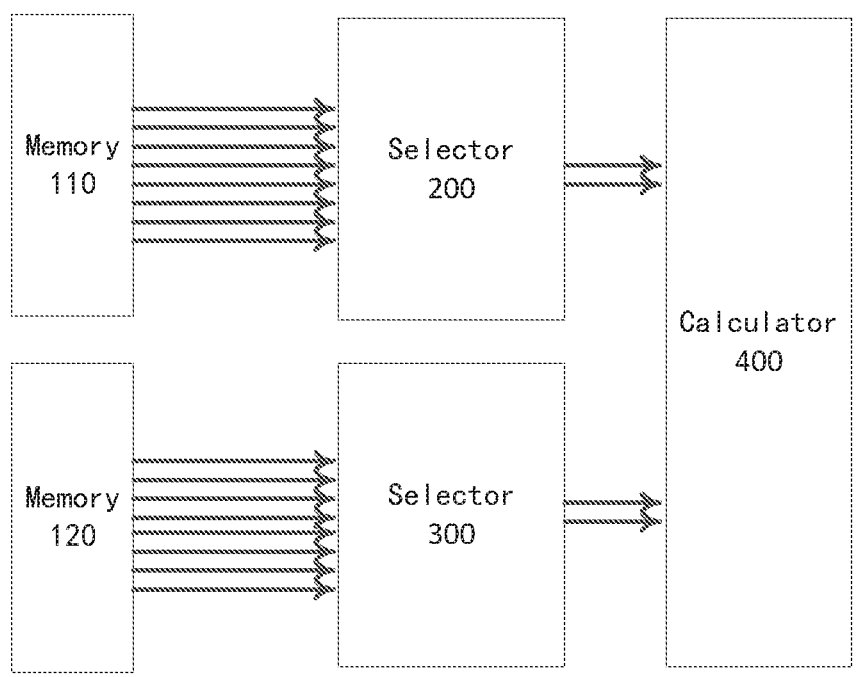
FIG. 2 illustrates a block diagram of an apparatus for performing a convolution operation in a convolutional neural network according to an embodiment of the present disclosure.

FIG. 2 shows a block diagram of an apparatus that can be used to efficiently achieve a convolution operation in sparsified convolutional neural network according to an embodiment of the present disclosure.

As shown in FIG. 2, an apparatus according to an embodiment of the present disclosure may include a selector 200, a selector 300, and a calculator 400.

The selector 200 may be coupled to a memory 110 which stores weight parameters and may select one or more nonzero elements in one or more channels of the one or more kernels of the weight parameter from the data stored by the memory 110, and the selected one or more nonzero elements are provided to the calculator 400. It would be appreciated that the weight parameters may have been sparsified such that only nonzero elements of the weight parameters are stored in the memory 110.

The selector 300 may be coupled to a memory 120 which stores feature data, and may select one or more data items in one or more channels of the feature data corresponding to the one or more channels selected by the selector 200 from the data stored in the memory 120, wherein the data item position of each selected data item depends on the element position of the corresponding nonzero element in one or more nonzero elements selected by the selector 200. Then, the selector 300 may provide the selected one or more data item positions to the calculator 400.

The calculator 400 multiplies the value of each data item received from the selector 300 with the value of the corresponding nonzero element from the selector 200, and accumulates the result obtained by multiplying.

One or both of the memory 110 and the memory 120 may be included in the apparatus according to an embodiment of the present disclosure, or may be independent of the apparatus according to an embodiment of the present disclosure or may be set outside the apparatus according to an embodiment of the present disclosure, and may be any form of volatile or non-volatile storage device such as a disk, an off-chip DDR, an on-chip SRAM, an on-chip register, and the like. Further, the memory 110 and the memory 120 may also be storage spaces in the same memory allocated for the weight parameter and the feature data, respectively, and such a memory may be any form of volatile or non-volatile storage device such as a disk, an off-chip DDR, an on-chip SRAM, an on-chip register, and the like. Further, in the memory 110, the weight parameters may be stored in a compact manner. That is to say, only nonzero elements of the weight parameters (for example, the original weight parameters or the sparsified weight parameters) may be stored in the memory 110.

Figure 3:
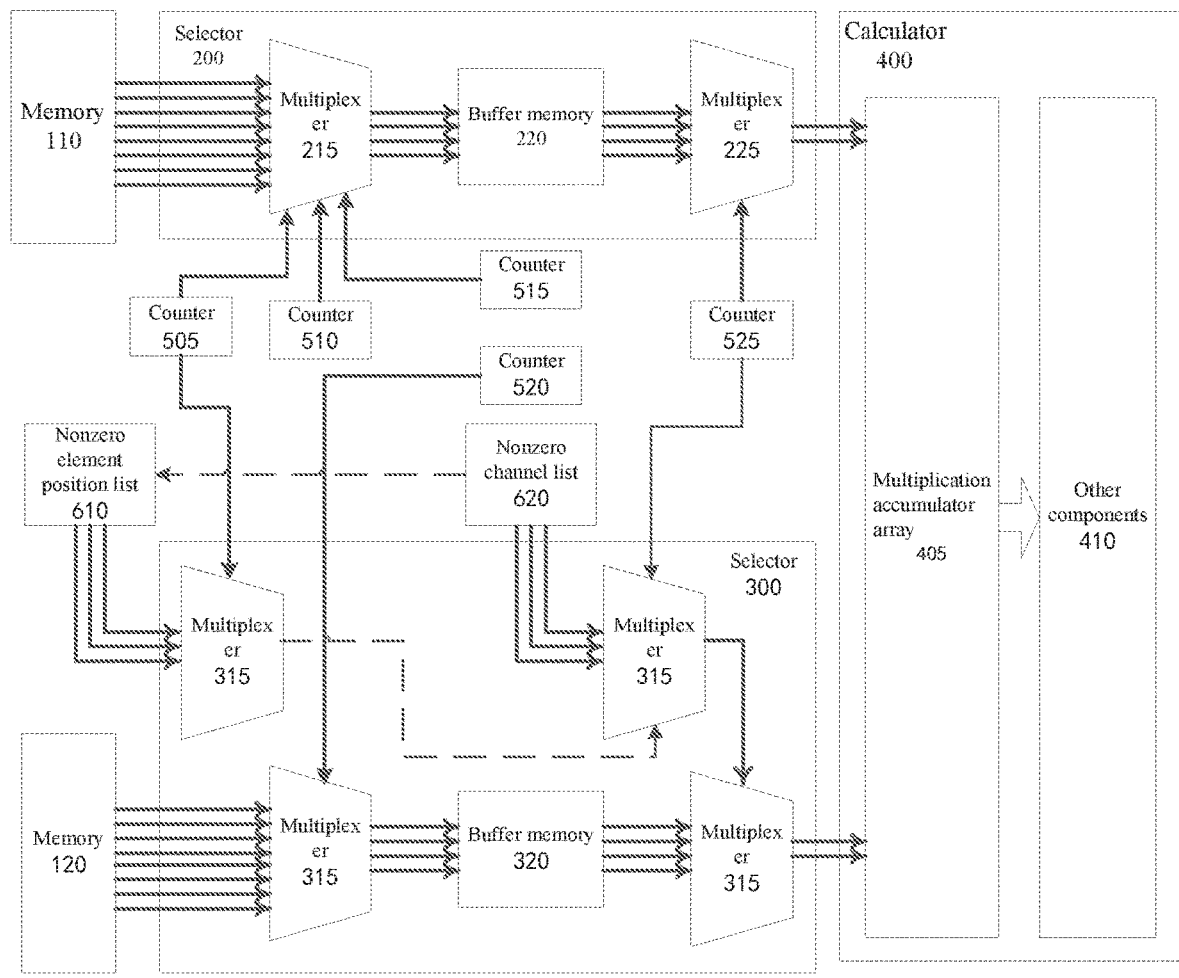
FIG. 3 illustrates an example of a structure of an apparatus for performing a convolution operation in a convolutional neural network according to an embodiment of the present disclosure.

FIG. 3 shows an example of a structure of an apparatus according to an embodiment of the present disclosure. As shown in FIG. 3, the selector 200 may include multiplexers 215 and 225 and a buffer memory 220, and the selector 300 may include multiplexers 315, 325, 330, and 335 and a buffer memory 320, and the calculator 400 may include a multiplication accumulator array 405 and other components 410. Further, the apparatus according to an embodiment of the present disclosure may also include counters 505, 510, 515, 520, and 525.

The multiplexer 215 includes an input terminal coupled to the memory 110, an output terminal coupled to the buffer memory 220, and a control terminal coupled to an output terminals of the counters 505, 510, and 515, such that a portion of data may be selected from the memory 110 and buffered into the buffer memory 220 under the control of the counting value output by the counters 505, 510, and 515. In an embodiment, a plurality of such multiplexers 215 may be arranged in parallel.

An input terminal of the multiplexer 225 may be coupled to the buffer memory 220. An output terminal of the multiplexer 225 may be coupled to the multiplication accumulator array 405 in the calculator 400. For example, each output terminal of the multiplexer 225 may be coupled to an input terminal of one or more multiplication accumulators in the multiplication accumulator array 405, respectively. A control terminal of the multiplexer 225 may be coupled to an output terminal of the counter 525, such that a portion of the data may be selected from the buffer memory 220 and output to the multiplication accumulator array 405 under the control of the count value output from the counter 525. In an embodiment, a plurality of such multiplexers 225 may be arranged in parallel.

The number of multiplexers 225 and the number of output terminals of each multiplexer 225 may depend on the operational capability of the multiplication accumulator array 405. For example, the buffer memory 220 and one or more multiplexers 225 may be provided every time the amount of data selected by the multiplexer 215 from the memory 110 is greater than the actual processing ability of the multiplication accumulator array 405. For example, a portion of data selected by the multiplexer 215 every time from the memory 110 may be buffered into the buffer memory 220, and then the portion of data in the buffer memory 220 may be provided to the multiplication accumulator array 405 in batches by the multiplexer 225, such that the amount of data received by the multiplication accumulator array 405 every time is within the range of the amount of data that can be processed. For example, assuming that the multiplication accumulator array 405 includes M multiplication accumulators (MAC), the multiply-add operation of K kernels, C channels, and P data points can may be performed every time, wherein K*C*P=M, then, the actual processing capacity of the multiplication accumulator array 405 may be determined according to these indexes.

Further, one or more buffer memories, of which data read delay is less than or much less than that of memory 110, or one or more buffer memories, of which data read delay matches the processing speed of, for example, the multiplication accumulator array 405, may be selected as the buffer memory 220, such that the multiplication accumulator array 405 may not have to stop to wait for data, thus the effect of data read delay on the execution efficiency of the convolution operation is reduced.

In other embodiments, the selector 200 may include only one or more multiplexers 215 without having to provide the buffer memory 220 and/or multiplexer 225. In such a case, the output terminals of the multiplexer 215 may be directly coupled to the multiplication accumulator array 405, and the output terminal of the counter 525 may be coupled to a control terminal of the multiplexer 215.

The input terminals of the multiplexer 315 may be coupled to the memory 120, the output terminals of the multiplexer 315 may be coupled to the buffer memory 320, and the control terminals of the multiplexer 315 may be coupled to the output terminals of the counters 510 and 520 and to an output terminal of the multiplexer 330. The input terminals of the multiplexer 330 are coupled to a memory storing a nonzero element position list 610, and the control terminal of the multiplexer 330 may be coupled to the output terminal of the counter 505. Thus, the combination of multiplexers 315 and 330 may select a portion of data from the memory 120 and buffer them into the buffer memory 320 based on the information in the nonzero element position list 610 under the control of the counting values output by the counters 505, 510, and 520. In an embodiment, a plurality of multiplexers 315 may be arranged in parallel, and the multiplexer 330 may be a type of 1-out-of-N multiplexer.

The input terminals of the multiplexer 325 may be coupled to the buffer memory 320. The output terminals of the multiplexer 325 may be coupled to the multiplication accumulator array 405 in the calculator 400. For example, each output terminal of the multiplexer 325 may be coupled to another input terminal of one multiplication accumulator in the multiplication accumulator array 405, respectively. The control terminal of the multiplexer 325 may be coupled to the output terminal of the multiplexer 335. The input terminals of the multiplexer 335 may be coupled to a memory storing a nonzero channel list 620, and the control terminal of the multiplexer 335 may be coupled to the output terminal of the counter 525. Thus, the multiplexers 325 and 335 may select a portion of data from the buffer memory 320 and output to the multiplication accumulator array 405 based on the information in the nonzero channel list 620 under the control of the counting value output by the counter 525. In an embodiment, a plurality of such multiplexers 325 may be provided in parallel, and the multiplexer 335 may be a type of 1-out-of-N multiplexer.

The number of multiplexers 325 and the number of output terminals of each multiplexer 325 may depend on the operational capability of the multiplication accumulator array 405. For example, the buffer memory 320 and one or more multiplexers 325 may be provided every time the amount of data selected by the multiplexer 315 from the memory 120 is greater than the actual processing capacity of multiplication accumulator array 405. For example, a portion of data selected by the multiplexer 315 every time from the memory 120 may be buffered into the buffer memory 320, and then the portion of data in the buffer memory 320 may be provided to the multiplication accumulator array 405 in batches by the multiplexer 325, such that the amount of data received by the multiplication accumulator array 405 every time is within the range of the amount of data that can be processed.

The control terminals of any one of the multiplexers 215, 225, 315, 325, 330, and 335 may include one or more programmable SRAM units (for example, one or more registers). In an embodiment, the multiplexer may select one or more input terminals as an active input terminal(s) based on the content stored in one or more programmable SRAM units and output data received from the active input terminal(s) through the output terminal. In other embodiments, the multiplexer may determine the address of the data to be read based on the content stored in one or more programmable SRAM units, and read the data at the determined address from the memory 110 or 120 or the buffer memory 220 or 320 and output them through the output terminal. Further, any of the multiplexers 215, 225, 315, 325, 330, and 335 may also include a logic control circuit for determining a read address of the data and/or for controlling which input terminals are active input terminals based on the contents stored in one or more programmable SRAM units.

Further, one or more buffer memories, of which data read delay is less than or much less than that of memory 120, or one or more buffer memories, of which data read delay matches the processing speed of the multiplication accumulator array 405, may be selected as the buffer memory 320, such that the multiplication accumulator array 405 may not have to stop to wait for inputting data, thus the effect of data read delay on the execution efficiency of the convolution operation is reduced.

In other embodiments, the selector 300 may include multiplexers 315, 330, and 335 without having to provide the buffer memory 320 and/or multiplexer 325. In such a case, the output terminals of the multiplexer 315 may be directly coupled to the multiplication accumulator array 405, and the output terminals of the multiplexer 335 may also be coupled to the control terminals of the multiplexer 315.

In other embodiments, other form of data selector or controller may also be used to replace the multiplexers 330 and 335, or a multiplexer with more complex structure but stronger processing capacity may be used to replace the multiplexers 315, 330, 335 and/or 325 and to realize all functions of 315, 330, 335 and/or 325, such that the selector 300 may include only one multiplexer.

The memory for storing the nonzero element position list 610 and the memory for storing the nonzero channel list 620 may be the same memory as the memory 110 or 120, or may be a different storage device than the memory 110 or 120.

The calculator 400 may also include other components 410, for example, which may be used to perform other operations related to convolution operations, such as activation, quantization, and the like.

The counter 505 may be used as a nonzero element position counter. In an embodiment, if each kernel of a group of kernels has the same distribution of nonzero elements and any kernel of the group of kernels has n nonzero element positions, the upper limit of the counting value of the counter 505 may be set as n−1, and the counter 505 is made to cyclically count from 0 to n−1. In another embodiment, all element positions in each kernel of a group of kernels may be regarded as nonzero element positions, and in such a case, the upper limit of the counting value of the counter 505 may be set as 8 (3*3−1=8), and the counter 505 is made to cyclically count from 0 to 8.

One control terminal of the multiplexer 215 receives the current counting value from the counter 505 and selects one or more nonzero elements from the memory 110 corresponding to the current counting value of counter 505 based on the current counting value of counter 505.

For example, assuming that a group of kernels of the weight parameter includes a kernel K1 in the example shown in FIG. 1 and a kernel K5 not shown in FIG. 1 but in which the distribution of nonzero elements is exactly the same as that in the kernel K2, then for a grouping including the two kernels K1 and K5, the counter 505 may cyclically count from 0 to 1 (K1 or K5 has two nonzero element positions 2 and 9). In response to the current counting value 0 from the counter 505, the multiplexer 215 may select from the memory 110 five nonzero elements in all five channels of the kernel K1 with the element positions being 2 and five nonzero elements in all five channels of the kernel K5 with the element position being 2 (For example, referring to L1 in FIG. 1), and the selected ten nonzero elements may be buffered into the buffer memory 220. When the current counting value from the counter 505 is 1, the multiplexer 215 may select from the memory 110 five nonzero elements in all five channels of K1 with the element positions being 9 and five nonzero elements in all five channels of K5 with the element position being 9 (For example, referring to L1 in FIG. 1), and the selected ten nonzero elements may be buffered into the buffer memory 220.

For example, assuming that another group of kernels of the weight parameter includes a kernel K2 in the example shown in FIG. 1 and a kernel K6 not shown in FIG. 1 but in which the distribution of nonzero elements is exactly the same as that of K2, then, for a group including the two kernels K2 and K6, the counter 505 may cyclically count from 0 to 8 (K2 or K6 has nine nonzero element positions 1 and 9). In response to the current counting value 5 of the counter 505, the multiplexer 215 may select from the memory 110 two nonzero elements in two nonzero channels of the kernel K2 with the element position being 5 and two nonzero elements in two nonzero channels of the kernel K6 with the element position being 5, and the selected four nonzero elements may be buffered into the buffer memory 220. When the current counting value from the counter 505 is 7, the multiplexer 215 may select from the memory 110 two nonzero elements in two nonzero channels of the kernel K2 with the element position being 7 and two nonzero elements in two nonzero channels of the kernel K6 with the element position being 7, and the selected four nonzero elements may be buffered into the buffer memory 220.

As shown in FIG. 3, the current counting value from the counter 505 is also provided to the control terminal of the multiplexer 330. The multiplexer 330 may look up a nonzero element position from the nonzero element position list 610 corresponding to the current counting value from the counter 505 based on the current counting value from the counter 505, and may provide the search result to a control terminal of the multiplexer 315. The multiplexer 315 may determine one or more data item positions based on the information received at the control terminal regarding nonzero element positions, and selects data items in one or more channels of the feature data at the determined one or more data positions from the memory 120.

For example, for the kernel K3 in FIG. 1, the counter 505 may cyclically count from 0 to 1 (there are two nonzero elements in K3, i.e. 2 and 3). When the current counting value from the counter 505 is 1, the multiplexer 215 selects from the memory 110 three nonzero elements (channels 3 to 5) in 3 nonzero channels of the kernel K3 with the element position being 3. At the same time, the multiplexer 330 may use the current counting value from the counter 505 as an index value to retrieve or select an item with the index value being 1 from the nonzero element position list L3, i.e. an item with the nonzero element position being 3 (referring to L3 in FIG. 1), then, the item or the retrieved element position 3 is provided to a control terminal of the multiplexer 315. Assuming that the kernel K3 has a stride being 2 in width direction and any padding is not performed to the feature data when the convolution operation is performed, the multiplexer 315 (e.g., a logic control circuit in the multiplexer 315) may determine one or more data item positions corresponding to the element position 3, such as (1,3), (1,5), (1,7), based on the information in the convolution operation. Then, the multiplexer 315 may select five data items in all five channels with the data item position being (1,3) from the memory 120, and five data items in all five channels with the data item position being (1,5) and five data items in all five channels with the data item position being (1,7), and the selected fifteen data items may be buffered into the buffer memory 320.

The counter 510 may be used as a channel group counter. The feature data and all channels of each kernel may be divided into one or more groups, each of which includes one or more channels. In an embodiment, the channels may be divided according to the selection capability (e.g., the number of input terminal) of the multiplexer 215 and/or 315. If the number of the group is C, the upper limit of the counting value of the counter 510 may be set to C−1, and the counter 510 may be made to cyclically count from 0 to C−1.

A control terminal of the multiplexer 215 receives the current counting value from the counter 510 and selects from the memory 110 one or more nonzero elements in one or more channels corresponding to the current counting value from the counter 510 based on the current counting value of the counter 510. At the same time, a control terminal of the multiplexer 315 also receives the current counting value from the counter 510, and selects from memory 120 one or more data items in one or more channels corresponding to the current counting value from the counter 510 based on the current counting value from the counter 510.

For example, assuming that in the example of FIG. 1, five channels are divided into two groupings, one of which corresponding to the counting value 0 from the counter 510 includes channels 1 to 3, and the other of which corresponding to the counting value 1 from the counter 510 includes channels 4 and 5, the counter 510 may be made to cyclically count from 0 to 1.

In this example, for the kernels K3 and K4 shown in FIG. 1, when the current counting value from the counter 510 is 0, the multiplexer 215 may select all nonzero elements in channels 1 to 3 of the kernel K3, i.e. (k3,1,2,1), (k3,1,2,2) and (k3,1,3,3), and may select all nonzero elements in channels 1 to 3 of the kernel K4, i.e. (k4,1,1,1), (k3,1,3,2) and (k3,3,3,1). Then, the selected six nonzero elements may be buffered into the buffer memory 220. At the same time, the multiplexer 315 may select all data items in channels 1 to 3 and buffer all selected data items into the buffer memory 320.

The counter 515 may be used as a kernel grouping counter. In an embodiment, assuming that the calculator 400 (e.g., the multiplication accumulator array 405) may process the convolution operation of K kernels in each operation, all kernels of the weight parameters of each layer may be divided into one or more groupings, each of which includes at most K kernels, and the number of groupings is G'. For this reason, the upper limit of the counting value from the counter 515 may be set to G'−1, and the counter 515 may be made to cyclically count from 0 to G'−1. In other embodiments, the kernels may be grouped according to the sparsifying manner or design requirements.

The current counting value from the counter 515 may be provided to the control terminal of the multiplexer 215. The multiplexer 215 may select from the memory 110 all nonzero elements of all kernels in the kernel grouping corresponding to the current counting value from the counter 515 according to the current counting value from the counter 515.

For example, assuming that in the example of FIG. 1, the kernels K1 to K4 are divided into two groupings, one of which corresponding to the counting value 0 from the counter 515 includes the kernels K1 and K2, and the other of which corresponding to the counting value 1 from the counter 515 includes the kernels K3 and K4, then, when the current counting value from the counter 515 is 1, the multiplexer 215 may select five nonzero elements of the kernel K3 (blocks with shadow in K3 shown in FIG. 1) and five nonzero elements of the kernel K4 (blocks with shadow in K4 shown in FIG. 1) from the memory 110, and the selected ten nonzero elements may be buffered into the buffer memory 220.

The counter 520 may be used as an output point grouping counter. For a designed convolutional neural network, given an input feature datum, the number of data items in the output feature datum of each layer may be known or calculated in advance. For instance, for the example in FIG. 1, one of data items of the output feature data may be obtained after performing a convolution operation on every forty-five data items (3*3*5=45) in the input feature datum. In other words, any data item of the output feature data is obtained by performing multiply-add operations on H*W*D data items of the input feature datum and H*W*D data items in one kernel, where H represents the height of each kernel (i.e. the number of rows), W represents the width of each kernel (i.e. the number of columns), and D represents the depth of each kernel (i.e. the number of channels). Assuming that the calculator 400 (e.g., the multiplication accumulator array 405) may support the calculation of p data items in the output feature data every time, according to the processing capability, the data items in the output feature data may be divided into one or more groupings, each of which may include at most p data items and the number of which is G. Thus, the upper limit of the counting value of the counter 520 may be set to G−1, and the counter 520 may be made to cyclically count from 0 to G−1. In other embodiments, the grouping manner of the data items in the input feature data may be determined, for example, by parallelism requirements or the like.

The current counting value from the counter 520 may be provided to one of the control terminals of the multiplexer 315. The multiplexer 315 may select one or more data items from the memory 120 according to the current counting value from the counter 520, wherein the data items in the data item grouping of the output feature data corresponding to the current counting value from the counter 520 are calculated according to the selected one or more data items.

For example, assuming that in the example of FIG. 1, each kernel slides a stride 2 in the width direction, and the input feature data in the memory 120 are not padded during the convolution operation, and the counting value 0 from the counter 520 corresponds to the data items (1,1,1), (1,1,2), (1,1,3), (1,1,4), (1,2,1), (1,2,2), (1,2,3) and (1,2,4) in the output feature data, the counting value 1 from the counter 520 corresponds to the data items (1,3,1), (1,3,2), (1,3,3), (1,3,4), (1,4,1), (1,4,2), (1,4,3) and (1,4,4) in the output feature data, when the current counting value from the counter 520 is 1, the multiplexer 315 may select all the data items of the input feature data at the data item positions (1,5), (2,5), (3,5), (1,6), (2,6), (3,6), (1,7), (2,7), (3,7), (1,8), (2,8), (3,8), (1,9), (2,9) and (3,9), respectively, from the memory 120, and the selected Seventy-five (15*5=75) data items are buffered into the buffer memory 320.

The counter 525 may be used as a nonzero channel grouping counter. In an embodiment, all nonzero channels of the weight parameters may be divided into one or more groupings, each of which may include one or more nonzero channels. In another embodiment, all nonzero channels of the weight parameters of one layer may be grouped according to, for example, the processing capacity of the multiplication accumulator array 405. In other embodiments, the counter 525 may cooperate with the counter 510. For example, a nonzero channel in a channel grouping corresponding to each counting value from the counter 510 may be divided into one or more nonzero channel groupings, i.e. all nonzero channels corresponding to nonzero elements in the buffer memory 220 may be divided into one or more nonzero channel groupings. In this embodiment, the control terminal of multiplexer 335 may also receive the current counting value from the counter 510. If the number of the nonzero channel groupings is C', the upper limit of the counting value of the counter 525 may be set to C'-1, and the counter 525 may be cyclically counted from 0 to C'-1.

The multiplexer 225 may receive the current counting value from the counter 525 through its control terminal, and select from the buffer memory 220 one or more nonzero elements in one or more nonzero channels corresponding to the current counting value from the counter 525 according to the current counting value from the counter 525, then, the selected one or more nonzero elements are output to the multiplication accumulator array.

The multiplexer 335 may receive the current counting value from the counter 525 through its control terminal, and select from the nonzero channel list 620 one or more nonzero channels corresponding to the current counting value from the counter 525 according to the current counting value from the counter 525, and the selected one or more nonzero channels are provided to the control terminal of the multiplexer 325. Then, the multiplexer 325 may select one or more data items in the selected one or more nonzero channels from the buffer 320 according to the control information on the one or more nonzero channels received at its control terminal. For this reason, it is possible to select from the buffer memory 320 one or more data items corresponding to one or more nonzero elements selected by the multiplexer 225. Then, the multiplexer 325 may output the selected one or more data items to the multiplication accumulator array 405, such that each multiplication accumulator in the multiplication accumulator array 405 may use each pair of nonzero elements and data items as the input and perform the multiplication operation, then, the addition results for each pair of nonzero elements and data items are accumulated.

In an embodiment, the retrieval/selection of the nonzero channel list 620 by the multiplexer 335 may incorporate an output of the current counting value from the counter 525 or the multiplexer 330. For example, the output terminal of the multiplexer 330 may be coupled to the control terminal of the multiplexer 335, or the output of counter 505 may be coupled to the control terminal of the multiplexer 335.

By means of the counter 525 and the nonzero channel list 620, the selector 300 may select the final one or more data items corresponding to one or more nonzero elements selected by the selector 200; on the other hand, the amount of data provided to the multiplication accumulator array 405 by the selector 200 and the selector 300 every time may be controlled within the processing capacity of the multiplication accumulator array 405.

The apparatus according to an embodiment of the present disclosure may include one of the counters 505, 510, 515, 520, and 525. For example, in a case where only a neural network processed in a manner of point-by-point sparsity is processed, only the counter 505 may be included, and the multiplexer 335 and the nonzero channel list 620 may not be set. In other embodiments, the apparatus according to an embodiment of the present disclosure may include a plurality of counters 505, 510, 515, 520, and 525. In a case where all counters 505, 510, 515, 520, and 525 are included, the apparatus according to an embodiment of the present disclosure may process the operation of the convolutional neural network sparsified in any manner.

In a case where a plurality of the counters 505, 510, 515, 520, and 525 (e.g., all) are included, whether each counter actually functions may be controlled by setting the upper limit of the counting values of each counter. For example, for the kernel in the example of FIG. 1, if the upper limit of the counting value of the counter 505 is set to 8, the multiplexer 215 and/or the multiplexer 330 actually may select all element positions in each kernel, not just the nonzero element positions.

In a case where a plurality of the counters 505, 510, 515, 520, and 525 are used, the selection result of the selector 200 and the selector 300 corresponds to the intersection of the selection results in a case where one of the counters is used alone. For example, in a case where the counter 505 is used alone, the selection result of the selector 200 is A, and in a case where the counter 510 is used alone, the selection result of the selector 200 is B, then, the selection result of the selector 200 is the intersection of A and B in a case where the counter 505 and the counter 510 are used at the same time.

For example, assuming that in the example of FIG. 1, all five channels are divided into two groupings, wherein the four kernels K1 to K4 of the layer are divided into 4 groupings, i.e. each kernel is used as a grouping; channels 1 to 3 are allocated in one channel grouping, channels 4 and 5 are allocated in another channel grouping, and each nonzero channel of each channel grouping is as one nonzero channel grouping; the stride of each kernel in the width direction is 2; no padding is performed on the input feature data in the memory 110 during the convolution operation; the input feature data in the memory 110 is not padded during the convolution operation; the data items in all channels of the output feature data at each of the two consecutive data item positions are allocated in one grouping.

When the current counting values from the counters 505, 510, 515, and 520 are 1, 0, 2, and 1, respectively, the multiplexer 215 may select nonzero elements (K3,1,3,3) in channels 1 to 3 with the element position being 3 (corresponding to the current counting value 1 of the counter 505, referring to L3 in FIG. 1) in the kernel K3 (corresponding to the current counting value 2 of the counter 515) from the memory 110 and buffer them into the buffer memory 220.

The multiplexer 330 selects an item with the index value being 1 in L3 such as in FIG. 1 from the nonzero element position list 610 according to the current counting value 1 of the counter 505, such that it is determined that the nonzero element position is 3, and the information is provided to the control terminal of the multiplexer 315.

Further, the multiplexer 315 selects all data items (1,7,1), (1,7,2), (1,7,3), (2,7,1), (2,7,2), (2,7,3), (3,7,1), (3,7,2), (3,7,3), (1,9,1), (1,9, 2), (1,9,3), (2,9,1), (2,9,2), (2,9,3), (3,9,1), (3,9,2) and (3,9,3) with the data item positions being (1,7), (2,7), (3,7), (1,9), (2,9) and (3,9) (these data item positions correspond to nonzero element positions 3), respectively, in channels 1 to 3 (corresponding to the current counting value 0 of counter 510) from all data items in the memory 120 with the data item positions being (1,5), (2,5), (3,5), (1,6), (2,6), (3,6), (1,7), (2,7), (3,7), (1,8), (2,8), (3,8), (1,9), (2,9) and (3,9), respectively (the corresponding data items in the output feature data correspond to the current counting value 1 of the counter 520).

Corresponding to the nonzero elements (K3,1,3,3) in the buffer memory 220, the current counting value from the counter 525 is 0. Accordingly, the multiplexer 225 may select nonzero elements (K3,1,3,3) from the data in the buffer memory 220. The multiplexer 335 determines an index value (for example, as described above, the current counting value from the counter 510 may be combined) based on the current counting value from the counter 525 and retrieves the nonzero channel list 620, such as the nonzero channel list L4 associated with the nonzero element position list L3 in FIG. 1, and the multiplexer 325 selects (1,7,3), (2,7,3), (3,7,3), (1,9,3), (2,9,3) and (3,9,3) from the data items (1,7,1), (1,7,2), (1,7,3), (2,7,1), (2,7,2), (2,7,3), (3,7,1), (3,7,2), (3,7,3), (1,9,1), (1,9,2), (1,9,3), (2,9,1), (2,9,2), (2,9,3), (3,9,1), (3,9,2) and (3,9,3) buffered in the buffer memory 320.

Each multiplication accumulator in the multiplication accumulator array 405 may receive each data item from the multiplexer 325 and a corresponding nonzero element from the multiplexer 225 to perform an operation. For example, one multiplication accumulator of a group of multiplication accumulators in the multiplication accumulator array 405 may receive nonzero elements (K3,1,3,3) from the multiplexer 225 and data items (1,7,3) from the multiplexer 325 as inputs and perform a multiplication operation; another multiplication accumulator in the group of multiplication accumulators can receive non-zero elements (K3,1,3,3) from the multiplexer 225 and data items (2,7,3) from the multiplexer 325 as inputs, and perform a multiplication operation and accumulate with the result of operation of the previous multiplication accumulator; and another multiplication accumulator in the group of multiplication accumulators can receive non-zero elements (K3,1,3,3) from the multiplexer 225 and data items (3,7,3) from the multiplexer 325 as input, and perform a multiplication operation and accumulate with the result of operation of the previous multiplication accumulator.

In an embodiment, each of the counters 505, 510, 515, 520, and 525 may be a register in which a counting value is stored. Further, the apparatus according to the embodiment may further include a timing controller (not shown) for timing the count of each counter. For example, the counter 505 may be made to cyclically count during each current counting value of the counter 515, or the counter 515 may be made to cyclically count during each current counting value of the counter 505. For example, the counter 510 may also be made to cyclically count during each current counting value of the counter 505, or the counter 525 may be made to cyclically count during each current counting value of the counter 505. Depending on the different manner of counting timing of each counter, the input data provided to the multiplication accumulator array 405 every time may be different, but the finally obtained result of the convolution operation is identical.

The apparatus according to an embodiment of the present disclosure has been described above. However, it should to be understood that the above mentioned embodiments are only exemplary but not limiting. The apparatus according to the embodiment of the present disclosure may have other components and/or structure.

Unless otherwise required clearly in the context, throughout the description and claims, the wordings such as "comprise" and "include" are to be construed in an inclusive sense, as opposed to an exclusive or exhaustive sense, that is to say, in a sense of "including but not limited to". Additionally, when used in the disclosure, the wordings of "herein", "above", "below" and similar wordings shall refer to the disclosure as a whole but not to any specific portion of the disclosure. When being permitted in the context, the wordings in singular or plural used in the above descriptions may also include the plural or singular, respectively. The wording of "or" in reference to a list of two or more items covers all of the following interpretations of the wording: any of the items in the list, all of the items in the list, and any combination of the items in the list.

While some embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure.

What is claimed is:

1. An apparatus included in a computer, the apparatus for performing a convolution operation in a sparsified convolutional neural network, comprising:
   a first selector coupled to a first memory of the computer storing weight parameters, and configured to select one or more first nonzero elements of one or more kernels of the weight parameters in one or more first channels, each first channel including at least one first nonzero element, and each first nonzero element being located at a same element position in the corresponding kernel, the element position being a two-dimensional location in two dimensions of height and width;
   a second selector coupled to a second memory of the computer storing input feature data, and configured to select one or more first data items of the input feature data in the one or more first channels corresponding to the one or more first nonzero elements, a data item position of each first data item in the input feature data being dependent on the element position of the corresponding first nonzero element, and each first data item being located in the same first channel with the corresponding first nonzero element, the data item position being a two-dimensional location in the two dimensions of height and width; and
   a calculator including a multiplication accumulator array configured to multiply each first data item from the second selector with the corresponding first nonzero element from the first selector to obtain a product, and accumulate the product.

2. The apparatus of claim 1, further comprising a first counter, the first selector being configured to select one or more second nonzero elements of the one or more kernels in one or more second channels according to a current counting value from the first counter.

3. The apparatus of claim 2, wherein the first selector is configured to select the one or more second nonzero elements of the one or more kernels in the one or more second channels by selecting all nonzero elements in each of the one or more kernels among all kernels of the weight parameters, the one or more kernels corresponding to the current counting value of the first counter, the one or more second channels including the one or more first channels, and the one or more second nonzero elements including the one or more first nonzero elements.

4. The apparatus of claim 2, wherein the first selector is configured to select the one or more second nonzero elements of the one or more kernels in the one or more second channels by selecting one or more nonzero elements in one or more channels of each of the one or more kernels at an element position corresponding to the current counting value of the first counter, the one or more second channels including the one or more first channels, and the one or more second nonzero elements including the one or more first nonzero elements.

5. The apparatus of claim 2, wherein the first selector is configured to select the one or more second nonzero elements of the one or more kernels in the one or more second channels by selecting one or more nonzero elements of the one or more kernels in one or more second channels corresponding to the current counting value of the first counter, the one or more second channels including the one or more first channels, and the one or more second nonzero elements including the one or more first nonzero elements.

6. The apparatus of claim 2, further comprising a second counter, the first selector being further configured to select the one or more first nonzero elements from the one or more second nonzero elements, the one or more first channels corresponding to a current counting value of the second counter.

7. The apparatus of claim 2, wherein the first selector includes one or more multiplexers.

8. The apparatus of claim 7, wherein the first selector further comprises:
a first buffer memory configured to buffer the one or more second nonzero elements.

9. The apparatus of claim 1, further comprising a first counter, the second selector being configured to select one or more second data items of the input feature data in one or more third channels according to a current counting value from the first counter.

10. The apparatus of claim 9, wherein the one or more second data items of the input feature data in the one or more third channels correspond to one or more data items in output feature data corresponding to the current counting value of the first counter, the one or more third channels including the one or more first channels, and the one or more second data items including the one or more first data items.

11. The apparatus of claim 9, wherein the second selector is configured to select the one or more second data items of the input feature data in the one or more third channels by:
retrieving the element position from a nonzero element position list by using the current counting value of the first counter as an index value of the nonzero element position list, the nonzero element position list recording element positions of nonzero elements in the one or more kernels;
determining one or more data item positions in the input feature data corresponding to the element position; and
selecting the one or more second data items in the input feature data at each of the determined data item positions in the one or more third channels, the one or more third channels including the one or more first channels, and the one or more second data items including the one or more first data items.

12. The apparatus of claim 9, wherein the one or more third channels correspond to the current count value of the first counter, the one or more third channels including the one or more first channels, and the one or more second data items including the one or more first data items.

13. The apparatus of claim 9, further comprising a second counter, and the second selector being further configured to
retrieve the one or more first channels from a nonzero channel list by using a current counting value of the second counter as an index value of the nonzero channel list, the nonzero channel list recording channels in which nonzero elements in the one or more kernels locate; and
select the one or more first data items in the one or more first channels from the one or more second data items.

14. The apparatus of claim 13, wherein the information recorded in the nonzero channel list also relates to the element positions of the nonzero elements in the one or more kernels.

15. The apparatus of claim 9, wherein the second selector includes one or more multiplexers.

16. The apparatus of claim 15, wherein the second selector further comprises:
a second buffer memory configured to buffer the one or more second data items.

17. The apparatus of claim 1, wherein the calculator is further configured to perform at least one of activation and quantization operations.

18. A computer-implemented method for performing a convolution operation in a sparsified convolutional neural network, comprising:
selecting, by a first selector coupled to a first memory of a computer storing weight parameters, one or more first nonzero elements of one or more kernels of the weight parameters in one or more first channels, each first channel including at least one first nonzero element, and each first nonzero element being located at a same element position in the corresponding kernel, the element position being a two-dimensional location in two dimensions of height and width;
selecting, by a second selector coupled to a second memory of the computer storing input feature data, one or more first data items of the input feature data in the one or more first channels corresponding to the one or more first nonzero elements, a data item position of each first data item in the input feature data being dependent on the element position of the corresponding first nonzero element, and each first data item being located in the same first channel with the corresponding first nonzero element, the data item position being a two-dimensional location in the two dimensions of height and width; and
multiplying, by a multiplication accumulator array of a calculator, each first data item from the second selector with the corresponding first nonzero element from the first selector to obtain a product, and accumulating the product.

19. The method of claim 18, wherein selecting one or more first nonzero elements of one or more kernels of the weight parameters in one or more first channels comprises:
selecting one or more second nonzero elements of the one or more kernels in one or more second channels according to a counting value from a first counter; and
selecting the one or more first nonzero elements from the one or more second nonzero elements, the one or more first channels corresponding to a counting value of a second counter.

20. The method of claim 18, wherein selecting one or more first data items of the input feature data in the one or more first channels comprises:
selecting one or more second data items of the input feature data in one or more third channels according to a counting value of the first counter;
retrieving the one or more first channels from a nonzero channel list by using the counting value of the second counter as an index value of the nonzero channel list, the nonzero channel list recording channels in which nonzero elements in the one or more kernels locate; and
selecting the one or more first data items in the one or more first channels from the one or more second data items.

* * * * *